US008009302B2

(12) United States Patent  
Martin

(10) Patent No.: US 8,009,302 B2
(45) Date of Patent: Aug. 30, 2011

(54) OBTAINING PRINT SYSTEM SETTINGS FOR SELECTED PRINT MEDIA ATTRIBUTES IN A NETWORKED PRINT JOB ENVIRONMENT

(75) Inventor: Michael J. Martin, Hamlin, NY (US)

(73) Assignee: Xerox Corporation, Norwalk, CT (US)

( * ) Notice: Subject to any disclaimer, the term of this patent is extended or adjusted under 35 U.S.C. 154(b) by 754 days.

(21) Appl. No.: 12/115,678

(22) Filed: May 6, 2008

(65) Prior Publication Data

US 2009/0279115 A1  Nov. 12, 2009

(51) Int. Cl.
*G06F 15/00* (2006.01)
*G06F 3/12* (2006.01)

(52) U.S. Cl. ........................................ 358/1.13; 358/1.6

(58) Field of Classification Search .................... 358/1.1, 358/1.6, 1.9, 2.1, 1.15, 1.13; 709/221, 216, 709/203; 710/5
See application file for complete search history.

(56) References Cited

U.S. PATENT DOCUMENTS

| | | | |
|---|---|---|---|
| 5,081,595 A | 1/1992 | Moreno et al. | |
| 5,835,820 A | 11/1998 | Martin et al. | |
| 6,304,732 B1 | 10/2001 | Myers et al. | |
| 6,647,222 B1 | 11/2003 | Digby et al. | |
| 7,317,882 B2 | 1/2008 | Dombrowski | |
| 7,583,398 B2 * | 9/2009 | Kaneshiro et al. | 358/1.15 |
| 2002/0063887 A1 * | 5/2002 | White | 358/1.15 |
| 2006/0195596 A1 * | 8/2006 | Kawai | 709/229 |
| 2007/0201048 A1 * | 8/2007 | DuBois | 358/1.1 |
| 2008/0071932 A1 * | 3/2008 | Gupta | 710/5 |

* cited by examiner

*Primary Examiner* — Jerome Grant, II
(74) *Attorney, Agent, or Firm* — Philip E. Blair; Fleit Gibbons Gutman Bongini & Bianco P.L.

(57) ABSTRACT

What is disclosed is a novel system and method for automatically retrieving and configuring the print device to a set of device specific system settings tailored for user selected media attributes. In one embodiment, an operator selects media attributes desired for a particular print job on a print device which then automatically queries a database over a network for a set of device specific system settings tailored to the selected media attributes. The database system determines the existence of at least one record stored in the database and provides that matching record data back to the print device. The matching record data is received and displayed on a user interface for review by an operator. The operator accepts/modifies the displayed system settings. The print device then automatically configures the device to the accepted device specific system settings.

18 Claims, 4 Drawing Sheets

OBTAINING PRINT SYSTEM SETTINGS FOR SELECTED PRINT MEDIA ATTRIBUTES IN A NETWORKED PRINT JOB ENVIRONMENT

TECHNICAL FIELD

The present invention is directed to systems and methods for automatically retrieving from a centralize database over a network various print system settings for a particular print engine based on attributes selected for a specific type of print media desired for a particular print job.

BACKGROUND

In the office-equipment context, such as copiers and printers, it is generally known to provide with each machine, a plurality of selectable paper trays, each having an identifiable type of print media therein. Different types of print media may include papers of differing sizes, letterhead, color paper, transparencies, and the like. Users may require specific types of print media such as forms or transparencies for a particular print job.

The availability of complex printing systems has greatly expanded the number of paper media types that may be specified for a particular print job depending on print engine characteristics and the quality desired. In order to accommodate the proliferation of print media types, complex printing systems need to be repeatedly reconfigured to a set of system settings optimized for a particular print media. Thus it is important to ensure an optimal work product that print system device operators manually reprogram the print system to handle different print media stocks to meet their customer's requirements. This could be a time consuming and costly process, particularly where the number of print jobs required to be reprogrammed is large.

Where the selection of available print media types is large, a print system device operator may wish to see very specific information about certain types of media displayed in detail such that one or more desired print media attributes can be selected for a given print job. Systems and methods have been developed in this art to provide users with interfaces displaying a description of print media attributes beyond basic paper-selection such as A4, Legal, etc. Certain print media stock may require specific formats of data such as margins, height, width, weight, marking characteristics, fuser temperature, electrostatic set points, transfer assist blade pressure, transfer nip pressure, ink settings, etc. requiring the configuration of print engine system settings which may vary greatly between print media types for any particular print job. Choosing the right system settings for a desired set of print media attributes may be time consuming and lead to error. End item print job products which have been run through a print system device configured to a set of system settings not optimized for a particular print media type or a set of print media attributes may lead to reduced output quality leading to an increase in customer dissatisfaction.

Furthermore, complex internal components running at very high throughput rates using configuration settings not optimized for a particular print media may even lead to device component breakdown and system failure. Thus it is important in this art to be able to properly configure a complex print system device to a set of system settings which have been optimized for a particular print media type.

In many of today's print engines, information regarding various complex system settings required for certain print media attributes is entered manually when an operator desires to run a new print job requiring a new print media. Manual entry for complex system settings can be time consuming. It may be difficult to ensure that the configuration settings were entered correctly. An incorrect system setting may not even be noticeable until a large volume of the print job has already been run. Further, it may be difficult to determine whether the existing system settings optimized for a specific set of print media attributes is current or has been updated in a timely manner as new configuration settings became available.

Useful information regarding complex system settings tailored for various print media attributes may be difficult to share in real-time across a plurality of diverse print job environments. Device operators may find it difficult to share their own tailored complex configuration settings with other operators of similar device specific print systems. Manufacturers and vendors may find it difficult to collect modified system settings for particular print media types from experienced device operators for evaluation.

Accordingly, what is needed in this art are increasingly sophisticated systems and methods for automatically retrieving and configuring a print system device to a set of device specific system settings tailored for selected print media attributes.

BRIEF SUMMARY

What is provided is a novel system, method, and computer program product for automatically retrieving and configuring the print system device to a set of device specific system settings tailored for user selected print media attributes. Complex document reproduction devices enhanced with the novel features hereof can automatically download from a centralized database over the internet device specific system settings tailored for the selected attributes of a particular print media desired for a print job. In such a manner, system performance can be optimized and document reproduction quality on a particular print media enhanced leading to increased overall customer satisfaction.

In one example embodiment, a method is disclosed for automatically downloading and configuring a print system device to a set of device specific system settings for a print media. An operator first selects from a user interface a set of attributes specific to a type of print media desired for a particular print job to be performed on the printing system. The print system then queries a database over a network for a set of device specific system settings tailored for the selected print media attributes. The centralized database system receives the query and determines the existence of a record which matches the query and which contains a set of system settings specific to the requesting device and tailored for the selected print media attributes. The matching record is retrieved. The system settings data is transmitted over the internet back to the requesting print system. The retrieved system settings are displayed on the user interface. If the database does not find a matching record or the database fails to respond to the query in a predetermined amount of time, a set of default system settings are retrieved and displayed. An operator reviews the displayed system settings tailored for the selected desired print media attributes. In one embodiment, the user operator can accept, reject, upload, or modify the displayed system settings. Upon an operator acceptance of the displayed system settings, a print system controller then dynamically configures the print device to the accepted system settings. Alternatively, the device controller automatically configures the print system device to the system settings without an operator acceptance. Additionally, the operator can upload a set of new or modified system settings tailored for a particular selection of print media attributes to the database wherein the record data is stored. User comments can also be associated with stored system settings and displayed.

A system is also disclosed herein. The system provides for the automatic retrieval and configuration of a print system device to a set of complex system settings tailored for a set of user selected print media attributes. In one embodiment, the system comprises a communication network for transmitting data between networked devices. The print system device is in communication with the network and includes a device controller for configuring the print system to a predetermined set of system settings. A database system is also provided which is capable of storing, indexing, and retrieving stored data records from a storage medium. The database system is in communication with the network. A processor is in communication with the database and the print system device. The processor executes machine readable instructions. The instructions include any of the following steps. An operator selects print media attributes displayed on a user interface. The attributes are desired by the operator for a particular print job to be performed by the print system device. In response to the print media attribute having been selected, the print system device queries the database system over the network for a set of device specific system settings based on the selected print media attributes. The database then determines the existence of one or more records stored in the database which match the query. Matching records contain a set of device specific system settings tailored for the selected print media attributes. At least one matching record stored in the database is retrieved and matching record data is transmitted over the network to the print system device. The received matching record data is displayed on the user interface for operator review. Upon acceptance of the displayed optimized system settings, the device controller is instructed to configure the print system device to the settings. Other features and variations are disclosed.

Advantageously, complex system settings can be shared in real-time. The database can be accessed by manufacturers and device vendors, among others, and the stored system settings for various print media attributes can be retrieved and analyzed for quality assurance and device performance. Improvement can be made thereto and the appropriate database records updated. The quantity and quality of records within the database system increases over time as more records are tailored and uploaded and as existing records are modified and pruned.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for automatically retrieving and configuring a print system device to a set of device specific system settings tailored for user selected print media attributes.

It should be understood that one of ordinary skill in this art would be readily familiar with many facets of networked print job environments, various print media and paper stock, and print engine settings commonly found in the xerographic arts. One of ordinary skill in this art would also be knowledgeable about computer science, databases, and software and programming systems and methods sufficient to implement the functionality and capabilities described in detail herein in their own hardware environments without undue experimentation.

As used herein, the term "system setting" or "configuration settings" means any system or subsystem setting applicable to a print engine which are associated with properties or attributes of a given paper stock, and which are used by the print engine to optimize performance. Further, the term "media", as used herein, refers to a set of attributes which includes color, weight, thickness, coating options, finish, and white point. The term "stock", as used herein, refers to a specific instance of a media and includes attributes such as size, grain direction, drilled, type, and ordered stock modulus. A single media can have many stocks associated with it but any given stock belongs to only a single media. In addition to those attributes relating to the physical substrate, media also includes data on how stocks are to be processed by the print engine.

There are print engine subsystem settings that are calculated based on the media and stock attribute such as, for instance, settings for sheet steering for image to paper registration control where media thickness and weight and stock size are important parameters and fuser temperature settings which require media thickness and weight for optimal performance. In addition there are other subsystem settings that are discretely set per paper stock and are not derived from the media and stock attributes. Some examples of such subsystem settings would be, for instance, ATA tip velocity control, transfer dicor control, and pre-transfer dicor control. In these cases the subsystem critical parameter setting, in the form of a voltage level, for example, are provided as part of the paper stock description. In some cases a separate critical parameter setting is provided for side 1 and side 2 of the paper stock.

Figure 1:
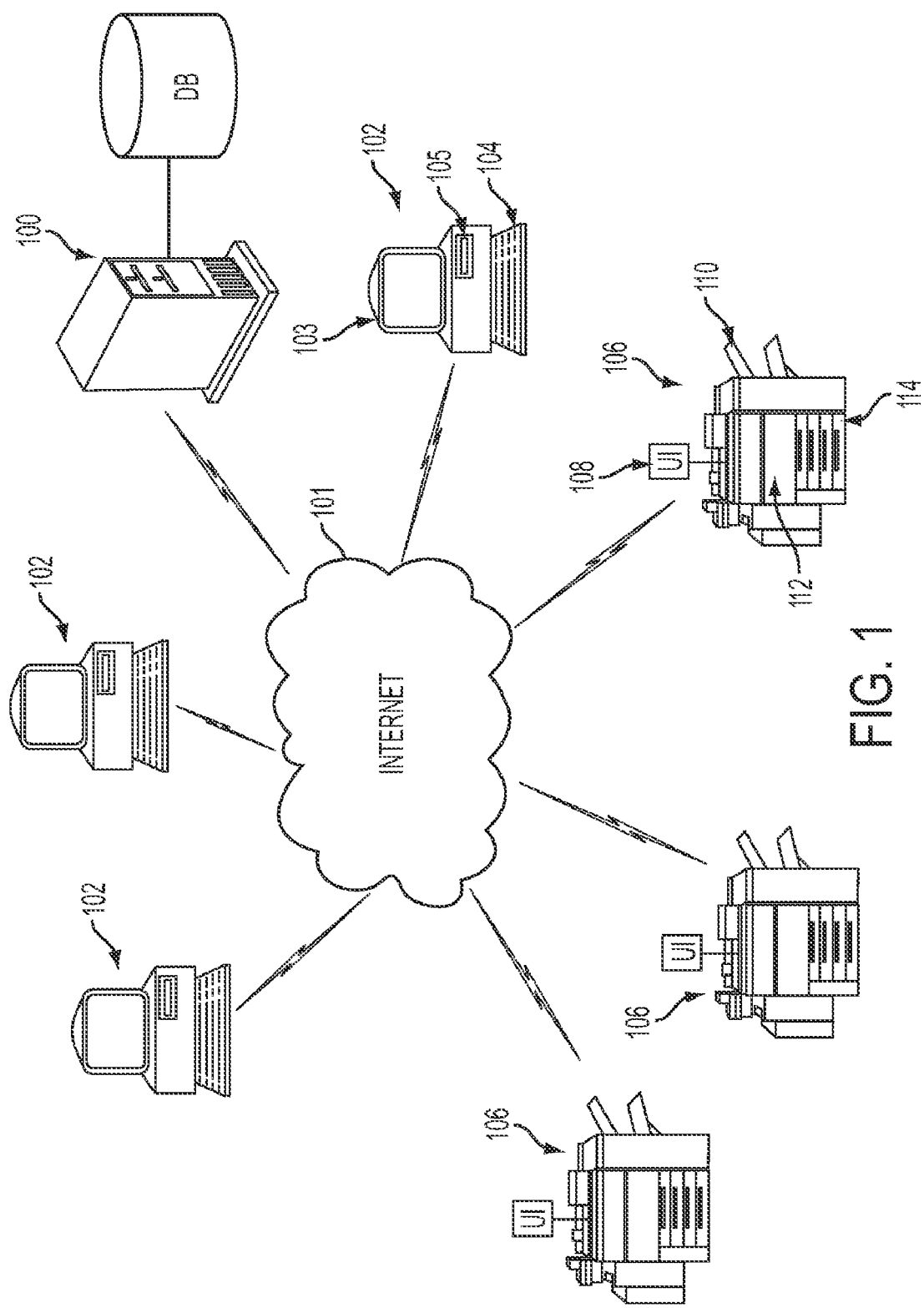
FIG. 1 illustrates one embodiment of an environment of computers 102, document reproduction systems 106, and a database system 100, networked via internet 101.

Reference is now being made to FIG. 1 which illustrates one embodiment of a networked environment of computers, printers, and a database in accordance with the present system and method.

Computer system 100 implements a database wherein various media records are stored, manipulated, and retrieved, in accordance with the present method. The computer system includes a processor capable of executing machine executable program instructions and a main memory to store machine readable instructions to be executed by the processor. The main memory is capable of storing data used by or produced by the processor and may include random access memory (RAM). The computer system includes an interface that forwards data over a communication bus to a communications routing device to network digital devices to the internet 101. The computer system also includes a hard disk drive and/or a removable storage drive which reads and writes to storage media devices such as a floppy disk, magnetic tape, optical disk, CD-ROM, DVC, etc., capable of storing software, programs, database files, utility programs, and other data.

Many aspects of the internet illustrated as an amorphous cloud and known as the world wide web, are commonly known. A further discussion as to the construction and/or operation of the internet itself has been omitted herein. Suffice it to say, data is transmitted in packets by a network of servers connected via a plurality of communication links. One device with open access to the internet can communicate with another device with open access to the internet through such data packets using established protocols. Data is transferred via the internet in the form of signals which may be, for example, electronic, electromagnetic, optical, or other signals. These signals are provided to a communications device such as a network server, which transmits and receives data packets by means of wire, cable, fiber optic, phone line, cellular link, RF, satellite, or any other medium or communications link known in the arts.

Records stored in a database of computer system 100 can be retrieved, modified, and updated by any of the computers 102 connected to the internet or otherwise in communication with the database system. It should be clearly understood that a record is any data structure capable of containing information which can be indexed, stored, searched, and retrieved by a database engine in response to a query. Computers 102 can be any of a desktop, laptop, server, mainframe, or the like, common in the arts. Computers 102 generally comprise a processor, memory, communications link, a display device 103 such as a CRT or LCD for data display, and a keyboard 104 for data entry, and a storage device 105 for storing data on a computer readable medium. Each of the computers may be placed in communication with any of the digital document reproduction systems 106 also similarly connected to the internet 101.

The set of digital document reproduction systems 106 generally encompasses any document reproduction apparatus including a digital copier, bookmaking machine, facsimile device, xerographic, or any other multi-function image reproduction device capable of performing a print job/copy job function for any purpose. Each computer 102 is capable of sending print job data to a selected printer over network 101. Each printer includes thereon a user interface (UI) 108 through which instructions can be entered into a data processing control system associated with the machine. The user interface may be any conventional user interface and may further include data entry devices such as a keyboard, numeric pad, or mouse. In one embodiment, the user interface comprises a touchscreen display. Each document reproduction device 106 also includes a paper tray 110, a processing control unit (shown generally at 112), and several paper trays 114 for retaining a variety of print media/stock.

Print media (i.e. paper, forms, cards, transparencies, etc.) can be defined by a set of attributes such as type, size, color, weight, etc. Print media can be further defined by type, size, color, weight, etc. For example, the print media (A4 paper) has the following attributes: type-plain; size-21.0 cm×29.7 cm; color-white; weight-90 gsm. Accordingly, the term "attribute" as used herein encompasses any type of characteristic such as type, size, color, weight, etc., by which print media may be identified. The term is intended to encompass any characteristic by which specific values for print media attributes may be differentiated. It should be appreciated that an attribute associated with a print media encompasses any set or subset of values used to identify and differentiate various print media based on one or more characteristics of that attribute. For example, a print media "type" attribute can be any of: plain, lightweight, recycled, mylar, etc. Similarly, a print media "size" attribute can be any of: letter, legal, executive, A4, A5, A6, etc. A print media "color" attribute can be any of: blue, green, etc. Values such as: lb, gsm, etc., can be associated with a print media "weight" attribute. Other attributes are clearly envisioned.

One skilled in this art would readily appreciate that various device components internal to a particular document reproduction system can be changed, modified, or otherwise configured by the control system 112 based on one or more of the attributes of the print media selected for the particular print job/copy job. Complex document reproduction systems have the ability to configure internal pathways to, for example, transport a certain type of print media having a particular size or orientation. Other internal components can be configured to, for example, adjust the amount of toner to be applied to a particular print media surface. Other components can be configured to, for example, change a temperature at which a toner is fused onto a surface of a particular type of print media. Sophisticated complex systems have many such components capable of being configured to one or more system settings based on print media attributes entered or otherwise selected by a user/operator. In print system devices 106, the operator can manually enter/change device configuration settings through user interface 108 to ensure optimal device performance and job quality for a given selected print media desired for a particular print job.

Figure 2:
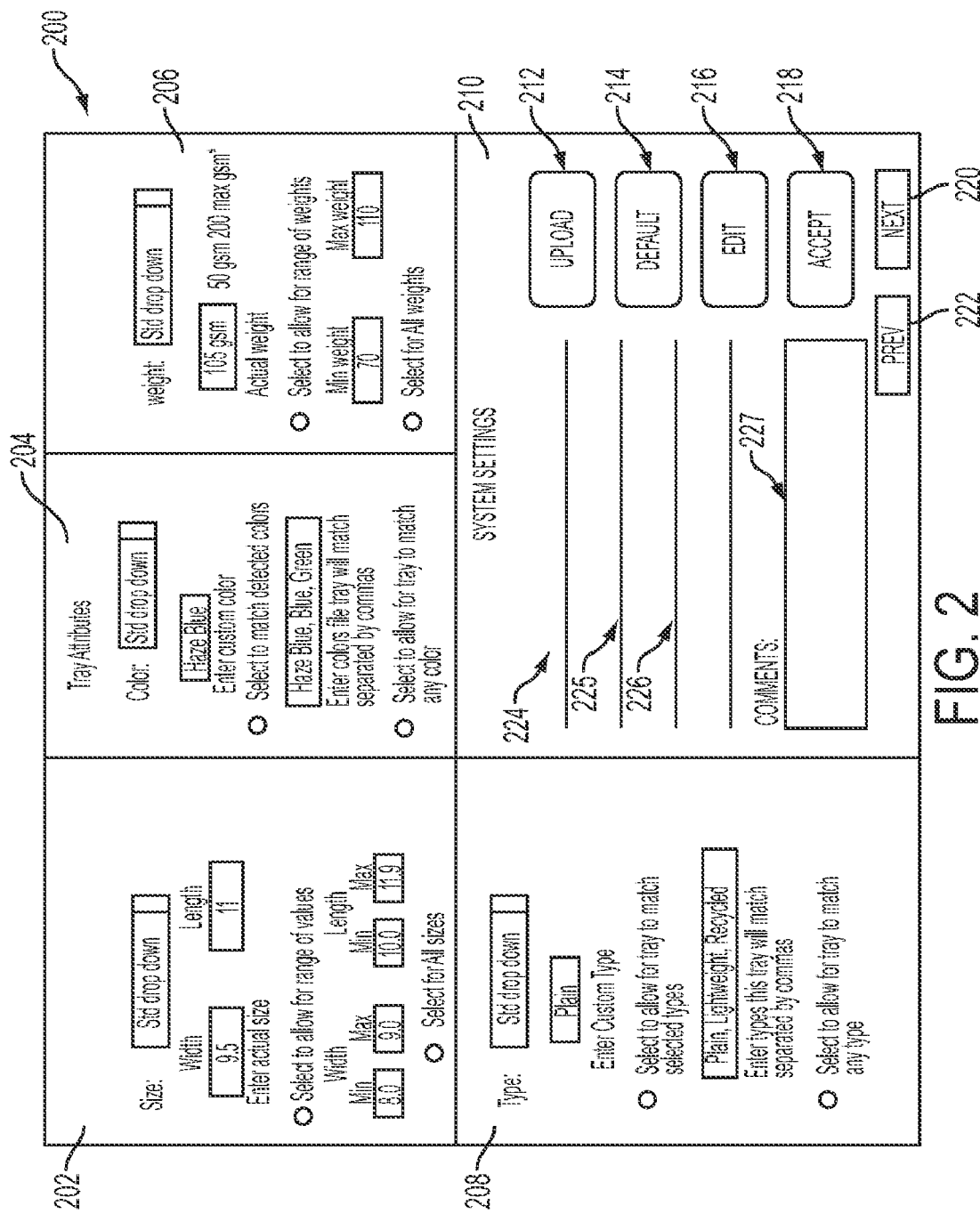
FIG. 2 illustrates a topside view of a touchscreen 200 that would appear to an operator via the user interface 108 for operator entry of attributes of a particular print media loaded in paper trays 114 of document reproduction system 106 of FIG. 1.

Reference is now being made to FIG. 2 which illustrates a topside view of a touchscreen 200 that would appear to an operator via the user interface 108 for operator selection of one or more attributes of a print media loaded in paper trays 114 of document reproduction system 106 of FIG. 1.

The user interface 108 includes program instructions for directing processor control unit 112 to configure the print system device 106 based on the selected print media attributes. The user interface further includes controls for displaying the range of values for the attributes and controls for displaying the system settings used to configure the print system device.

The print media attributes are entered via the user interface and stored in a memory accessible by control unit 112. The operator can program or reprogram the attributes for any print media loaded in any paper tray 114. Alternatively, touching the touchscreen 200 of the user interface may actuate a keypad or alphanumeric keyboard (not shown) for manually entering or overriding any of the print media attributes or system settings. Various touchscreen portions of the user interface 108 are described as follows.

User interface touchscreen portion 202 enables the operator to program values for print media size. If the print media has a standard size, the operator may actuate a drop down menu containing a list of print media sizes and select the size for the media loaded in the paper tray. The touchscreen portion 202 allows the operator to scroll to an appropriate value for width or length or manually enter values, or selecting the option may actuate a numeric keypad displayed on the touchscreen. The touchscreen portion 202 also includes a wildcard option allowing any print media in the paper tray to be used for any print job sent to the printer no matter what size is specified in the print job. As a quality control check, the control system would ensure that the attributes sensed by paper tray sensors for the media loaded in the paper tray fall within acceptable parameters.

User interface touchscreen portion 204 enables the operator to program values for print media color. If the print media has a standard color, the operator may actuate a drop down menu containing a list of standard colors and select the appropriate color for the print media loaded in the paper tray, or enter a value for color. The touchscreen portion 204 allows the operator to scroll to an appropriate value or manually enter values, or selecting the option may actuate a numeric or alphanumeric keypad displayed on the touchscreen. The operator may elect to use a wildcard enabled by the touchscreen portion.

User interface touchscreen portion 206 enables the operator to program values for print media weight. If the print media has a standard weight, the operator may actuate a drop down menu containing a list of standard weights and select the weight for the print media loaded in the paper tray. The touchscreen portion 206 allows the operator to scroll to the appropriate value or manually enter values, or selecting the option may actuate a numeric keypad displayed on the touchscreen. The touchscreen portion 206 may allow the operator to scroll up or down to the appropriate value. The touchscreen also includes a wildcard option.

User interface touchscreen portion 208 enables the operator to program values for print media type. If the print media has a standard type, the operator may actuate a drop down menu containing a list of standard types and select the type for the print media loaded in the paper tray. The touchscreen portion 208 allows the operator to scroll up or down to the appropriate value, or selecting the option may actuate a numeric keypad displayed on the touchscreen. The touchscreen also includes a wildcard option.

Once the operator has finished entering or selecting values for the various attributes of the print media desired for the print/copy job, the document reproduction system 106 automatically goes online and queries computer database system 100 for the existence of one or more records stored therein containing system settings optimized for that particular print system and tailored for the selected attributes of the desired print media. If at least one record is found for the selected print media attributes specific for the requesting printing system then the record is retrieved from the database and sent to the print system device. If a record matching the query is not found in the database or the print system device does not receive a response from the database in a predetermined amount of time then a set of default system settings is retrieved from a local storage device or memory (not shown).

Processor control unit 112 receives the one or more retrieved data records. The data is interpreted or otherwise decoded and the information is displayed on user interface screen portion 210. Text message strings are associated with the system settings in a desired language. The user/operator can then review the downloaded system settings and select any of a plurality of options as will be further explained herein.

In one embodiment, the system settings display portion 210 of the user interface 108 comprises a display window portion for displaying text messages associated with the retrieved (or default) system settings and further comprises a plurality of touchscreen buttons. The button options include an UPLOAD button 212, a DEFAULT button 214, an EDIT button 216, and an ACCEPT button 218. The buttons also include a NEXT button 220 and a PREV button 222 enabling the operator to peruse a plurality of screens of system settings in the instance wherein a plurality of varying system settings exist which are tailored to the selected print media attributes from which the operator needs to select a desired setting for the print job.

Screen 210 further includes a plurality of alphanumeric text displays 224, 225, and 226 for editable display of the downloaded system settings retrieved over the internet from the database system. A comment section 227 is enabled wherein user comments stored with the system settings are display. The comments may alert the operator to nuances in any of the settings or provide additional insights that the operator may wish to consider regarding the displayed system settings.

When the operator of the print system device 106 has reviewed the displayed device specific system settings on the touchscreen portion 210, the operator may elect to edit the display settings by pressing touchscreen EDIT button 216. The operator would then edit one or more of the displayed system settings 224-227. If the operator is satisfied with the system settings, the operator can press touchscreen ACCEPT button 218. The control system 112 would proceed to configure the internal components of the print system device 106 to the accepted system settings. The print job would proceed.

If the operator, on the other hand, was not satisfied with the displayed system settings, he or she could press the touchscreen DEFAULT button 214 which would load and display set of preprogrammed default system settings. If the user was satisfied with the displayed default settings then he or she would press the ACCEPT button 218 would cause the control system to configure the print system components based on the accepted default settings.

If, on the other hand, the operator entered their own set of system settings perhaps in response to no matching record having been retrieved by the or edited one or more of the displayed settings, pressing the touchscreen UPLOAD button 212 would cause the printing system to access the internet and upload the system settings to the centralized database system 100 wherein a new record for the device containing the modified system settings would be created, indexed, and stored appropriately for subsequent querying and record retrieval.

If no record was found in the database for the particular print system device based on the selected attributes of the print media, a set of locally stored default parameters are displayed for the operator to edit and accept. The operator could upload the default settings in response to no records having been found in the database tailored for the print media attributes selected by the operator. As new print media became available, system operators would upload to the database the device system settings which they found were useful along with their user comments which they would like to add. In such a manner, the number of records stored in the database would dynamically grow over time as more and more records were created and uploaded.

It should be understood that the touchscreen 200 and any of the touchscreen portions 202, 204, 206, 208, and 210, as described herein, can be configured by software to display a wide variety of numeric values, textual information, scroll bars, dials, slideable bars, selectable buttons, and the like, for entering, selecting, uploading, or editing any of the displayed information. The embodiment shown is only illustrative and may include any other functionality which any touchscreen known in the arts is capable of displaying. The system settings touchscreen portion 210 merely illustrates the combination of editable displayed text fields and selectable options buttons together on a single display. Software to configure the user interface or any touchscreen portion thereof to display/enter/accept data is often device dependent and software algorithms may be proprietary to a device manufacturer. Therefore a further discussion regarding specific programming techniques and software algorithms to program or otherwise configure a touchscreen device is omitted herein. One skilled in this art would program their user interface and touchscreen portions thereof to display the system settings they feel are necessary for an operator to review/edit/accept for their specific document reproduction system in their particular print job environment.

When the user hits the ACCEPT button, the printer control system would interpret the system settings and make the necessary configurations accordingly. The controller would also determine whether any of the paper trays contains print media having the attributes entered. If one of the paper trays contains such print media, the control system would feed the desired print media to the printing device from the appropriate paper tray. If none of the paper trays contains print media having specified ranges of values for the print media attributes that include the attributes required by the print job, the printer control system would have to then determine whether any of the paper trays contained print media having wild card ranges for attributes required for that print job. If one of the paper trays contains such print media, the printer control system would feed the print device system from the appropriate paper tray. If none of the paper trays contains print media having wild card ranges for the print media attributes that include the attributes required by the print job, the printer control system would notify the user/operator that the print job cannot proceed and provide an appropriate message to the operator as to the reasons why the job has failed and provide an indication how to correct the problem.

Such notification may include an alarm sound and/or a message displayed on the user interface. In the event that more than one tray contains print media having the exact attributes required by the print job, more than one tray contains print media having specified ranges of values for the print media attributes that include the attributes required by the print job, or more than one tray contains print media having wild card ranges for the print media attributes that include the attributes required by the print job, the printer control system will determine which of the trays meeting the attribute criteria is highest in a default tray ranking and feed the printer from such tray.

Figure 3:
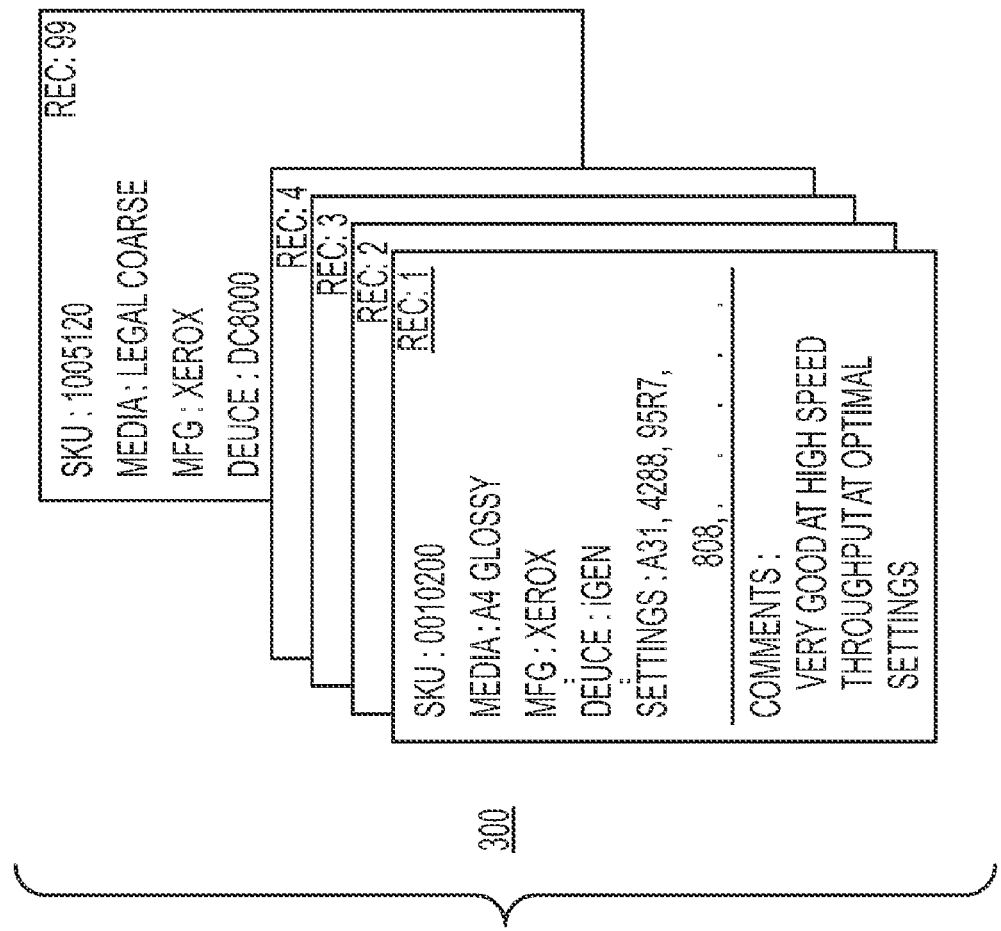
FIG. 3 illustrates a plurality of indexed retrievable records stored in the database of computer system 100 of FIG. 1.

Reference is now being made to FIG. 3 which illustrates a plurality of indexed retrievable records 300 stored in database system 100 shown also having a display device 103 such as a CRT or LCD for data display, a keyboard 104 for data entry, and a computer readable medium 107 capable of containing machine executable instructions for performing the present method. The computer readable medium also for loading/offloading records to/from the database. The database computer system includes a communications interface (not shown) which acts as both an input and an output to allow software and data to be transferred to external devices. Examples of a communications interface include a modem, a network interface (such as an Ethernet card), a communications port, a PCMCIA slot and card, etc.

The database system 100 is one known in the arts which is capable of indexing a plurality of records, receiving and interpreting a query, and retrieving one or more of the appropriate records in response to the query. The database is also capable of adding new records and updating existing records already stored. Since database construction, optimization, indexing, and record retrieval techniques are well known in the arts, a further discussion as to a specific database implementation is omitted herein. Suffice it to say that one of ordinary skill would be able to store, index, and retrieve a matching record containing one or more system settings and provide the same in response to a query over a network such as the internet.

It should be also be clearly understood that the information contained in any of the records shown in FIG. 3, or any of the display screens provided herewith, is merely for explanatory purposes. For instance, the SKU number of the records pertains to no specific device. Any relation to an actual device is purely coincidental. Likewise, the sequence of alphanumeric codes provided in the "settings" field such as: A31, 42BB, 95R7, and B08 of the record shown (FIG. 3) are illustrative and intended to represent codes which might be retrieved, decoded, interpreted, and understood by a controller of printing system device 106. The system controller would then configure the device based on the system settings codes. Text strings can be easily retrieved from a local storage medium and associated with the system setting codes such that the appropriate text message is displayed in the appropriate language on the system settings display portion 210 of user interface 200 for the operator. Systems settings pertaining to any print system device tailored to at least one print media attribute which can be captured in a record stored in a database is envisioned and intended to fall within the scope of the appended claims. Any type of data structure for a record can be utilized which facilitates a search of the information contained therein and retrieved in response to a query.

Figure 4:
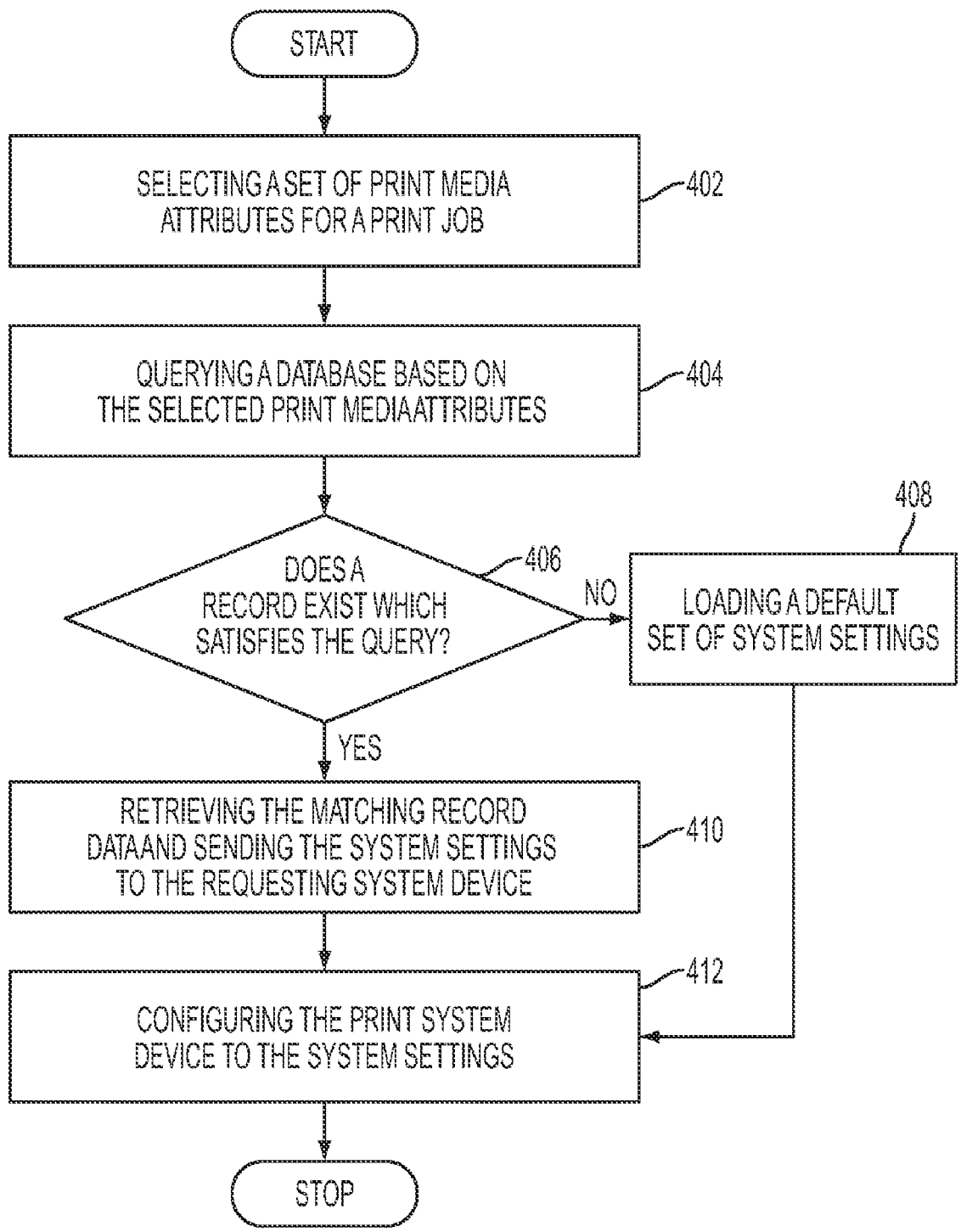
FIG. 4 is a flow diagram of one embodiment of the present system and method for automatically retrieving and configuring a print system device to a set of device specific system settings tailored for user selected print media attributes.

Reference is now being made to the flow diagram of FIG. 4 which illustrates a flow diagram of one embodiment of the present method for automatically retrieving and configuring the print system device to a set of device specific system settings tailored for user selected print media attributes.

In one example embodiment, at step 402, an operator selects from a user interface a set of print media attributes. The attributes are specific to a type of print media desired for a particular print job. The attributes also could include a media vendor's part number or SKU for a desired media. At step 404, the print system queries a database over a network for system settings based on the selected print media attributes. The database system receives the query. At step 406, a determination is made whether a record satisfying the query exists in the database. A matching record would contain a system settings specific to the requesting device and tailored for the selected print media attributes. If a matching record is not found by the database system or the requesting device did not receive a response to the query after a predetermined amount of time, at step 408, a set of default system settings are retrieved. The default system settings can be loaded from a local storage device. The default system settings would also be tailored for the selected print media attributes. If a matching record is found in response to the query, at step 410, the matching record is retrieved and sent to the requesting print system device. At step 412, a system controller then configures the print system device to the system settings.

In another embodiment, the system settings are displayed to the print system device operator. The operator reviews the displayed device specific system settings. The operator makes a decision to accept, reject, or modify the displayed system settings. The operator may decide to proceed with a set of default system settings if the operator does not wish to proceed with the displayed system settings. If the user accepts the displayed system settings, then the device controller proceeds to configure the print system device to the accepted settings.

The operator can modify the displayed system settings by changing one or more of the settings. The operator can upload to the database system their own system settings tailored to a particular set of selected print media attributes wherein the information is stored. Comments associated with various system settings can also be uploaded, stored, retrieved, displayed, and edited. Other variations hereof are envisioned.

It should be understood that the present method can be carried out in whole or in part on a print system device, a computer system in network communication with the print system device, or on each. Further, the database of the present system may reside locally to the print system device. Some or all of the functionality of the database may be integrated with the print system device. Some of the functionality of the controller responsible for configuring the print system device to the device specific system configuration settings may reside as part of or be directly controlled by one or more components of the computer system database server.

The present system and method provides the advantage of a centralized internet-accessible database wherein complex system settings for complex document reproduction systems tailored to a set of user selected attributes for a particular print media can be automatically retrieved, modified, uploaded, and utilized in real-time. The quantity and quality of records within the database system increases over time as more records are tailored and uploaded and as existing records are modified and pruned.

The database can be accessed by manufacturers and device vendors, among others, and the stored system settings for various media attributes can be retrieved from the database over the internet using, for example, an administrator or a manufacturer's access ID and password to retrieve stored records pertinent to their own print system devices. Retrieved records can be correlated, sorted, assimilated, reviewed, and otherwise analyzed by analysts, demographers, statisticians, designers, operators, and the like, for quality assurance and device performance. Manufacturers and vendors may modify one or more records and upload the modified records to the online database using their access accounts and passwords. Media and device manufacturers and vendors could create reports based on items such as frequency of use, frequency of association of a given media with a given print engine device.

Complex document reproduction devices enhanced with the various features of the present system and method effectively enables system operators to have real-time access to the most current device system settings. The current system settings can be downloaded automatically, displayed and reviewed by the device operator. A device controller can automatically configure the print system to the set of complex system settings tailored to the attributes selected for the type of print media desired for the job. Performance is increased and print job quality enhanced. Other uses and variations hereof are envisioned. Such uses and variations are intended to fall within the scope of the appended claims.

Terms such as, computer program medium, computer executable medium, computer usable medium, computer readable medium, as used herein, refer to media such as main memory and secondary memory, removable storage devices, a hard disk installed in hard disk drive, and signals containing a data structure therein. These products are means for providing instructions and/or data to a computer system. The computer readable medium stores data, instructions, messages packets, or other machine readable instructions and information. Computer readable medium, for example, may include non-volatile memory, such as a floppy, ROM, flash memory, disk memory, CD-ROM, and other permanent storage useful, for example, for transporting information, such as data and computer instructions. Computer readable medium may also comprise computer readable information in a transitory state medium such as a network link and/or a network interface, including a wired network or a wireless network, which allows a computer to read such computer readable information. Computer programs may be stored in main memory and/or a secondary memory. Computer programs may also be received via a communications interface. Such computer programs when executed, enable a computer system to perform the features and capabilities provided herein.

It should be understood that the flow diagrams depicted herein are illustrative. Other operations, for example, may be added, modified, enhanced, condensed, integrated, or consolidated. Variations thereof are envisioned and are intended to fall within the scope of the appended claims. It should also be understood that the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions. Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. A computer usable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The article of manufacture may be included on at least one storage device readable by a machine architecture or other xerographic or image processing system embodying executable program instructions. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. Accordingly, the embodiments set forth herein above are considered to be illustrative and not limiting. Various changes to the above-described embodiments may be made without departing from the spirit and scope of the invention.

What is claimed is:

1. A method for configuring a print device to system settings tailored for a print media, the method comprising:
   receiving at least one print media attribute of a print media desired for a print job to be performed on a print device;
   searching a database for a record containing at least one device specific system setting for said selected print media attribute;
   in response to a record being found in said database:
      retrieving said record from said database;
      sending said retrieved record to said print device; and
      configuring said print device to said device specific system setting; and
   in response to a record not being found in said database:
      obtaining at least one default device specific system setting; and
      configuring said print device to said default device specific system setting.

2. The method of claim 1, further comprising modifying said retrieved device specific system setting prior to said configuring of said print device.

3. The method of claim 1, wherein, in response to a plurality of records containing different device specific system settings for said selected print media attribute having been found in said database, further comprising:
   retrieving, from said database, said plurality of records of different device specific system settings;
   selecting one of said retrieved device specific system settings; and
   configuring said print device to said selected device specific system setting.

4. The method of claim 1, further comprising:
   displaying said retrieved device specific system setting on a user interface; and
   configuring said print device in response to a user acceptance of said displayed device specific system setting.

5. The method of claim 1, further comprising uploading a record of device specific system settings to said database which are based on print media attributes.

6. The method of claim 1, further comprising retrieving from said database customer usage data.

7. A system for configuring a print device to system settings tailored for a print media, the system comprising:
   a communication network for transmitting data between networked devices;
   a print device in communication with said network and having a controller for configuring said print system to a set of system configuration settings;
   a database capable of storing, indexing, and retrieving stored data records from a storage medium; and
   a processor in communication with said database and said print device, said processor executing machine readable instructions for performing:
   searching said database for a record containing at least one device specific system setting based on for said selected print media attribute;
   in response to a record being found in said database:
      retrieving said record from said database;
      sending said retrieved record to said print device; and
      configuring said print device to said device specific system setting; and
   in response to a record not being found in said database:
      obtaining at least one default device specific system setting; and
         configuring said print device to said default device specific system setting.

8. The system of claim 7, further comprising modifying said retrieved device specific system setting prior to said configuring of said print device.

9. The system of claim 7, wherein, in response to a plurality of records containing different device specific system settings for said selected print media attribute having been found in said database, further comprising:
   retrieving, from said database, said plurality of records of different device specific system settings;
   selecting one of said retrieved device specific system settings; and
   configuring said print device to said selected device specific system setting.

10. The system of claim 7, further comprising:
   displaying said retrieved device specific system setting on a user interface; and
   configuring said print device in response to a user acceptance of said displayed device specific system setting.

11. The system of claim 7, further comprising uploading a record of device specific system settings to said database which are based on print media attributes.

12. The system of claim 7, further comprising retrieving from said database customer usage data.

13. A computer program product for configuring a print device to system settings tailored for a print media, the computer program product comprising:
   a non-transitory computer readable media for storing instructions that, when executed on a computer, cause the computer to perform a method comprising:
   searching a database for a record containing at least one device specific system setting for said selected print media attribute;
   in response to a record being found in said database:
      retrieving said stored matching record from said database;
      sending said retrieved record to said print device; and
      configuring said print device to said device specific system setting; and
   in response to a record not being found in said database:
      obtaining at least one default device specific system setting; and
         configuring said print device to said default device specific system setting.

14. The computer program product of claim 13, wherein, in response to a plurality of records containing different device specific system settings for said selected print media attribute having been found in said database, further comprising:
   retrieving, from said database, said plurality of records of different device specific system settings;
   selecting one of said retrieved device specific system settings; and
   configuring said print device to said selected device specific system setting.

15. The computer program product of claim 13, further comprising:
   displaying said retrieved device specific system setting on a user interface; and
   configuring said print device in response to a user acceptance of said displayed device specific system setting.

16. The computer program product of claim 13 further comprising retrieving from said database customer usage data.

17. The computer program product of claim 13, further comprising uploading a record of device specific system settings to said database which are based on print media attributes.

18. The computer program product of claim 13, further comprising modifying said retrieved device specific system setting prior to said configuring of said print device.

* * * * *